United States Patent [19]

Igonin et al.

[11] 4,223,105

[45] Sep. 16, 1980

[54] METHOD FOR PREPARING HETEROCHAIN POLYMERS

[76] Inventors: Vadim B. Igonin, ulitsa Usti na Labe, 4, kv. 5; Vladimir Z. Nikonov, ulitsa Usti na Labe, 22, kv. 13; Lev B. Sokolov, ulitsa Truda, 18, kv. 35; Valentin M. Savinov, ulitsa Usti na Labe, 20, kv. 20; Vitaly A. Vasiliev, ulitsa Egorova, 5, kv. 61; Vladimir M. Ivanov, ulitsa Lunacharskogo, 12, kv. 5, all of Vladimir; Vladimir A. Nikiforov, ulitsa 1 Kirova, 7a, kv. 18, Kalinin; Savely A. Zhizhilev, Migalovo, 22, kv. 57, Kalinin; Tatyana I. Nikitina, prospekt Chaikovskogo, 31a, kv. 87, Kalinin; Lidia A. Klimenko, ulitsa Stroitelei, 10, kv. 29, Kalinin; Olga I. Mischenko, Migalovskaya naberezhnaya, 10, kv. 19, Kalinin, all of U.S.S.R.

[21] Appl. No.: 820,217

[22] Filed: Jul. 29, 1977

[51] Int. Cl.[2] ...................... C08G 63/16; C08G 63/18; C08G 63/22; C08G 69/28

[52] U.S. Cl. .................................. 528/179; 528/176; 528/192; 528/193; 528/194; 528/207; 528/208; 528/336; 528/337; 528/338; 528/339; 528/340; 528/341; 528/343; 528/345; 528/347; 528/348

[58] Field of Search .......................... 260/47 C, 78 R; 528/176, 179, 192, 193, 194, 207, 208, 336, 337, 338, 339, 340, 341, 343, 345, 347, 348

[56] References Cited

U.S. PATENT DOCUMENTS 4,009,153 2/1977 Shin .................................. 260/78 R

OTHER PUBLICATIONS

Powdered Nylon 66, *Synthetic High Polymers,* p. 5281, 1963, Tokyo Rayon Co., Ltd., Ogata, Naoya.

*Primary Examiner*—Lester L. Lee
*Attorney, Agent, or Firm*—Burgess, Ryan and Wayne

[57] ABSTRACT

A method for preparing heterochain polymers, viz. polyamides or polyarylates which comprises an interphase polycondensation of diamines or bisphenols with dihaloanhydrides of dicarboxylic acids; said interphase polycondensation is performed by atomization of dihaloanhydrides of dicarboxylic acids in the form of an aerosol by means of a compressed gas into an aqueous solution of said diamines or bisphenols; concentration of said dihaloanhydrides of dicarboxylic acids in the aerosol is maintained within the range of from $0.4 \times 10^{-4}$ to $2 \times 10^{-4}$ mol/l of the gas; dihaloanhydrides of dicarboxylic acids which are solid under normal conditions are melted or dissolved prior to the atomization in organic solvents which are inert with respect to said dihaloanhydrides of dicarboxylic acids to a concentration of from 5 to 20 mol/l of the solvent; dihaloanhydrides of dicarboxylic acids which are liquid under normal conditions are fed directly to atomization; the desired product is then isolated from the suspension resulting from the interphase polycondensation. The method of the present invention makes it possible to substantially reduce (by 10 to 40 times) the consumption of an organic solvent or totally avoid its use in the process. It also makes possible to produce polymers in the form of fibrides pg,2 thus making more simple and efficient the manufacture of synthetic paper and filter materials. The method of the present invention is technologically simple and can be performed both by a continuous and a periodic scheme.

13 Claims, No Drawings

METHOD FOR PREPARING HETEROCHAIN POLYMERS

FIELD OF APPLICATION OF THE INVENTION

The present invention relates to the preparation of polymers by way of interphase polycondensation and, more specifically, to methods of preparing heterochain polymers such as polyamides and polyarylates. Said polymers are useful in the manufacture of plastic articles, fibres, synthetic paper, filter materials, and varnishes.

BACKGROUND OF THE INVENTION

Known in the art is a method for preparing heterochain polymers, such as polyamides, by interphase polycondensation of diamines with dihaloanhydrides of dicarboxylic acids which is effected by atomization of the latter in the form of a aerosol by a compressed gas into an aqueous solution of diamines. Prior to atomization, said dihaloanhydrides of dicarboxylic acids (which are liquid under normal conditions) are dissolved in organic solvents inert in respect of said dihaloanhydrides to a concentration ranging from 0.1 to 0.5 mol/l of the solvent.

This prior art method has a disadvantage in that a diluted solution of a dihaloanhydride in an organic solvent is used in the reaction. This necessitates regeneration of large quantities of the organic solvent, and the process as a whole becomes substantially complicated.

To perform the process by the prior art method, it is necessary to subject, to a deep drying, great amounts of the organic solvent because of the danger of saponification of dihaloanhydrides of dicarboxylic acids.

The specific character of the interphase polycondensation in the above-mentioned prior art method (i.e., the necessity of an exact metering of the starting monomers, the use of mechanical stirring, etc.) hinders the performance of the process by a continuous scheme.

BRIEF SUMMARY OF THE INVENTION

It is an object of the present invention to provide a method for preparing heterochain polymers, viz. polyamides and polyarylates which would be simple technologically and which could be performed both continuously and periodically.

It is another object of the present invention to provide a method for preparing heterochain polymers which would make it possible to substantially reduce the consumption rate of an organic solvent or avoid its use in the process whatsoever.

These and other objects are accomplished by a method for preparing heterochain polymers, viz. polyamides and polyarylates, by way of an interphase polycondensation of diamines or bisphenols with dihaloanhydrides of dicarboxylic acids by atomization of the latter in the form of an aerosol by means of a compressed gas into an aqueous solution of diamines of bisphenols, followed by isolation of the desired product, wherein in accordance with the present invention, dihaloanhydrides of dicarboxylic acids, which are solid under normal conditions, are melted or dissolved in organic solvents inert in respect of said dihaloanhydrides of dicarboxylic acids to a concentration of from 5 to 20 mol/l of the solvent, whereas dihaloanhydrides of dicarboxylic acids which are liquid under normal conditions are fed directly to atomization; concentration of dihaloanhydrides of dicarboxylic acids in the aerosol is maintained within the range of from $0.4\times10^{-4}$ to $2\times10^{-4}$ mol/l of the gas.

In the method according to the present invention, use can be made of organic solvents which are inert in respect of dihaloanhydrides of dicarboxylic acids, pertaining to different classes, e.g. dichloromethane, tetrahydrofuran, benzene, methylethylketone or anhydrous acetic acid.

The interphase polycondensation can be performed at a temperature within the range of between 20° and 100° C., though to achieve a maximal molecular weight and maximal yield of a heterochain polymer, it is preferable to conduct the synthesis at a temperature within the range of between 90° and 95° C.

In order to increase molecular weight of heterochain polymers, it is advisable that the interphase polycondensation be performed under the pressure of 0.8 atm. g. at 110°-115° C.

To prepare heterochain polymers directly during the synthesis in the form of fibrides which can be used, without any preliminary treatment, for the manufacture of a synthetic paper and filler materials, it is advisable to use, in the method according to the present invention, an aqueous solution of diamines or bisphenols containing 0.02 to 10% by weight of a sufactant.

Among surfactants it is preferable to use a mixture of sodium alkylbenzosulphonates with the alkyl radical containing 12 to 18 carbon atoms; sodium diisopropylnaphthalene sulphonate, polyoxyethylene ether of isooctylphenol.

For the same purpose, it is most preferable to perform atomization of dihaloanhydrides of dicarboxylic acids in the form of an aerosol by means of a compressed gas into an aqueous solution of diamines of bisphenols through a grate with a free section ranging from 25 to 65% and with a hole diameter of from 1.5 to 5 mm.

By the term "free section" of a grate there is meant a ratio of a total area of cross-sections of the holes to a total area of the grate cross-section expressed in percent.

In order to obtain heterochain polymers in the form of fibrides of a more uniform structure, it is advisable to perform atomization, simultaneously with atomization of dihaloanhydrides of dicarboxylic acids, of an aqueous solution of diamines or bisphenols counter-currently to the aerosol so that the stream of the atomized aqueous solution would totally cover the grate cross-section.

In contrast to the atomization of dihaloanhydrides of dicarboxylic acids which is effected by means of a compressed gas to obtain an aerosol of said compounds, atomization of an aqueous solution of diamines or bisphenols is effected by means of a mechanical nozzle without using any compressed gas. There is thus produced an atomized aqueous solution, not aerosol.

The method for preparing heterochain polymers according to the present invention makes it possible to use concentrated solutions (5 to 20 mol/l of the solvent) of dihaloanhydrides of dicarboxylic acids, wherefore consumption rates of organic solvents are reduced by 10 to 40 times and their regneration is made more economically efficient. In the case of using dihaloanhydrides of dicarboxylic acids which are liquid under normal conditions, or dihaloanhydrides of dicarboxylic acids which are solid under normal conditions, in a molten state, an organic solvent is totally excluded from the process thus avoiding the process of regneration thereof.

In the method according to the present invention there is no need to have a strict metering of the starting monomers (diamines, bisphenols, dihaloanhydrides of dicarboxylic acids). Agitation during the interphase polycondensation is effected by a compressed gas such as air which simultaneously produces an aerosol.

The above-mentioned advantages of the method according to the present invention make it possible to simplify the process technology and perform it both continuously and periodically.

The method according to the present invention makes it possible to obtain heterochain polymers in the course of said interphase polycondensation directly in the form of fibrides which simplifies the production of synthetic paper and filter materials and makes it more efficient from the economic standpoint.

DETAILED DESCRIPTION OF THE INVENTION

In the method according to the present invention, as the diamines, use can be made of aliphatic diamines such as ethylene diamine, tetramethylene diamine, hexamethylene diamine, dodecamethylene diamine, a mixture of ethylene diamine with hexamethylene diamine; cycloaliphatic diamines such as piperazine, N, $\beta$-aminoethylpiperazine, methylpiperazine; aromatic diamines such as meta-xylylene diamine, para-xylylene diamine and metaphenylene diamine.

As the bisphenols in the method according to the present invention, use can be made of, for example, resorcinol, phenolphthalein, diphenylolpropane.

As dihaloanhydrides of dicarboxylic acids, use can be made of dichloroanhydrides of aliphatic dicarboxylic acids such as oxalic acid, glutaric acid, azelaic acid, adipic acid, sebacic acid, fumaric acid; dichloroanhydrides of aromatic dicarboxylic acids such as isophthalic acid, terephthalic acid, diphenyloxide-4,4'-dicarboxylic acid; a mixture of dichloroanhydrides of isophthalic and terephthalic acids; a mixture of dichloroanhydrides of fumaric and terephthalic acids; difluoroanhydrides of aliphatic and aromatic dicarboxylic acids, e.g. difluoroanhydride of isophathalic acid.

As the organic solvents which are inert in respect of dihaloanhydrides of dicarboxylic acids, use can be made of hydrocarbons (heptane, benzene and the like); chlorinated derivatives of hydrocarbons (such as dichloromethane, chloroform, dichloroethane), ethers and esters (such as ethyl ether, tetrahydrofuran), ketones (such as acetone, methylethylketone), anhydrous organic acids (such as acetic acid, formic acid, and the like.

In the method according to the present invention, as the surfactants, use can be made of anionic substances such as fat-base soaps, alkylsulphonates (such as sodium octadecylsulphonate, sodium laurylsulphonate), alkylbenzosulphonates (such as a mixture of sodium alkylbenzosulphonates with the alkyl radical containing 12 to 18 carbon atoms, sodium diisopropylnaphthalene sulphonate); non-ionic surfactants such as polyoxyethylene ether of isooctylphenol; cationic compounds such as aliphatic diamines containing at least 6 carbon atoms in the hydrocarbon radical.

The method according to the present invention makes it possible to prepare both homopolymers and copolymers using in the process of said interphase polycondensation, both individual diamines, bisphenols and dihaloanhydrides of dicarboxylic acids, and mixtures of diamines, mixtures of bisphenols, mixtures of dihaloanhydrides of dicarboxylic acids.

The method for preparing heterochain polymers (polyamides or polyarylates) can be performed both periodically and continuously. The continuous scheme of the process is preferable. This is effected in the following manner.

An aqueous solution of a diamine or bisphenol at a temperature within the range of from 20° to 100° C., preferably from 90° to 95° C., is continuously pumped into a reactor. The process of an interphase polycondensation is effected, as a rule, under atmospheric pressure. When it is required to increase the molecular weight of the resulting heterochain polymers, the process is conducted under a pressure of 0.8 atm.g. and at a temperature of the aqueous solution of diamine or bisphenol of from 110° to 115° C. The temperature of the aqueous solution defines the temperature of the reaction of interphase polycondensation.

In the lower section of the reactor, there is mounted a gas nozzle through which a dicarboxylic acid dihaloanhydride is continuously atomized in the form of an aerosol into an aqueous solution of a diamine or bisphenol. Prior to atomization, the dicarboxylic acid dihaloanhydride which is solid under normal conditions is liquified, i.e., melted or dissolved in an organic solvent to a concentration of from 5 to 20 mol/l of the solvent, whereas the dicarboxylic acid dihaloanhydride which is liquid under normal conditions, is atomized without any preliminary treatment.

Upon contacting said aerosol of the dicarboxylic acid dihaloanhydride with diamine or bisphenol, a polymer is formed in the form of a fine powder, fibrides or agglomerates. The polymer suspension is continuously discharged from the upper section of the reactor and the polymer is recovered therefrom, e.g. by filtration, or centrifugation whereafter the resulting polymer is washed with water and dried.

In the case where diamines are used as the starting monomers, chemical combining of a hydrogen halide evolved in the process of interphase polycondensation is effected either by an excess of the starting diamine, or by means of conventional acceptors of hydrogen halides added into the solution of diamines such as caustic soda, caustic potash, sodium carbonate, a ternary amine, or by a combination of the above-mentioned techniques. In the case where, monomers, as the starting use is made of bisphenols, combining of a hydrogen halide evolved in the process of interphase polycondensation is effected by means of acceptors of hydrogen halides added into the solution of bisphenols.

For a better understanding of the present invention some specific Examples illustrating its embodiments are given hereinbelow.

EXAMPLE 1

An aqueous solution of hexamethylene diamine at a concentration of 0.1 mol/l and temperature of 20° C. is continuously fed at the rate of 20 l/hr into a reactor. Isophthalic acid dichloroanhydride which is solid under normal conditions is melted (m.p. 43° C.) and continuously fed into a nozzle for atomization by means of compressed air to produce an aerosol of isophthalic acid dichloroanhydride. The dichloroanhydride of isophthalic acid in the form of an aerosol is passed into the aqueous solution of hexamethylene diamine. The size of aerosol particles of isophthalic acid dichloroanhydride is at most 70 mcm; concentration of said particles in the aerosol is $1\times10^{-4}$ mol/l of air. The supply rate of air into the nozzle is 2.5 $m^3$/hr; compressed air temperature is 60°-80° C.

The resulting suspension of polyhexamethylene isophthalamide is continuously discharged from the reactor; the polymer is filtered-off, washed with water and air-dried at a temperature of from 110° to 120° C.

The logarithmic viscosity of a 0.5% solution of the polymer in sulphuric acid is 0.8 dl/g. The polymer yield is 85% as calculated for isophthalic acid dichloroanhydride. The softening point of the polymer is 195° C.

EXAMPLE 2

Following the procedure described in the foregoing Example 1, there is obtained polyhexamethylene isophthalamide with the only exception that the reaction temperature is maintained at about 100° C.

The logarithmic viscosity of a 0.5% solution of the polymer in sulphuric acid is 1.35 dl/g. The polymer yield is 98% as calculated for isophthalic acid dichloroanhydride. The softening point of the polymer is 195° C.

EXAMPLE 3

An aqueous solution of meta-phenylene diamine at a concentration of 0.05 mol/l containing 0.1 mol/l of a hydrogen chloride acceptor, viz. sodium carbonate, at a temperature of 20° C. at the rate of 20 l/hr is continuously fed into a reactor. Isophthalic acid dichloroanhydride which is solid under normal conditions is melted and continuously fed into a nozzle for atomization by means of compressed air to give an aerosol of isophthalic acid dichloroanhydride. The latter is passed into the aqueous solution of meta-phenylene diamine. Concentration of particles of the atomized isophthalic acid dichloroanhydride in the aerosol is $2\times10^{-4}$ mol/l of air. The air supply rate in the nozzle is 5 $m^3$/hr.; temperature of compressed air is 60°-80° C.

The resulting suspension of polymetaphenyleneisophthalamide is continuously discharged from the reactor; the polymer is filtered-off, washed with water and dried.

The logarithmic viscosity of a 0.5% solution of the polymer in sulphuric acid is 0.33 dl/g. The polymer yield is 92% as calculated for isophthalic acid dichloroanhydride.

EXAMPLE 4

An aqueous solution of hexamethylene diamine (at a concentration of 0.1 mol/l) heated to a temperature of from 90° to 95° C. at the rate of 50 l/hr is continuously fed into a reactor. Terephthalic acid dichloroanhydride which is solid under normal conditions is melted (m.p. 86° C.) and in the molten condition, is continuously atomized through a nozzle by means of compressed air to give an aerosol of terephthalic acid dichloroanhydride. The latter is passed into the aqueous solution of hexamethylene diamine. Concentration of particles of the molten atomized terephthalic acid dichloroanhydride in the aerosol is $2\times10^{-4}$ mol/l of air. The supply rate of air into the nozzle is 3 $m^3$/hr; temperature of compressed air is 120°-140° C.

The resulting suspension of polyhexamethyleneterephthalamide is continuously discharged from the reactor; the polymer is filtered-off, washed with water and dried.

The logarithmic viscosity of a 0.5% solution of the polymer in sulphuric acid is 0.9 dl/g. The polymer yield is 92% as calculated for terephthalic acid dichloroanhydride. Softening temperature of the polymer is 250° C.

EXAMPLE 5

Following the procedure described in the foregoing Example 4 there is obtained polyhexamethylene isophthalamide with the use, as the starting monomers, hexamethylene diamine and isophthalic acid difluoroanhydride.

The logarithmic viscosity of a 0.5% solution of the polymer in sulphuric acid is 1.28 dl/g. The polymer yield is 95% as calculated for isophthalic acid difluoroanhydride. The softening temperature of the polymer is 195° C.

EXAMPLE 6

Following the procedure described in Example 4 hereinbefore, there is obtained polypiperazine terephthalamide; in doing so, as the starting monomers, use is made of piperazine and terephthalic acid dichloroanhydride. Concentration of particles of atomized terephthalic acid dichloroanhydride in the aerosol is $0.40\times10^{-4}$ mol/l of air. The supply rate of air into the nozzle is 5 $m^3$/hr.

The logarithmic viscosity of a 0.5% solution of the polymer in sulphuric acid is 0.62 dl/g. The polymer yield is 70% as calculated for terephthalic acid dichloroanhydride. The polymer has its softening temperature of 310° C.

EXAMPLE 7

In a manner similar to that described in the foregoing Example 4 there is obtained polypiperazine isophthalamide with the use, as the starting monomers, of piperazine and iosphthalic acid dichloroanhydride. Concentration of particles of atomized isophthalic acid dichloroanhydride in the aerosol is $0.40\times10^{-4}$ mol/l of air. The supply rate of air into the nozzle is 5 $m^3$/hr.

The logarithmic viscosity of a 0.5% solution of the polymer in sulphuric acid is 1.92 dl/g. The polymer yield is 89% as calculated for isophthalic acid dichloroanhydride.

EXAMPLE 8

Following the procedure described in Example 4 hereinbefore, a polymer is obtained on the basis of meta- or paraxylylene diamine and isophthalic acid dichloroanhydride. The concentration of particles of the atomized isophthalic acid dichloroanhydride in the aerosol is $0.40\times10^{-4}$ mol/l of air. The supply rate of air into the nozzle is 5 $m^3$/hr.

The logarithmic viscosity of a 0.5% solution of the polymer in sulphuric acid is 0.37 dl/g. The polymer yield is 87% as calculated for isophthalic acid dichloroanhydride.

EXAMPLE 9

In a manner similar to that described in Example 4 hereinbefore a polyarylate is obtained on the basis of resorcinol and a mixture of 60% by weight of isophthalic acid dichloroanhydride and 40% by weight of terephthalic acid dichloroanhydride. Atomization of the mixture of molten dichloroanhydrides is performed by means of compressed nitrogen. In the process use is made of an aqueous solution of resorcinol containing 0.2 mol/l of an acceptor of hydrogen chloride, i.e. caustic soda.

The logarithmic viscosity of a 0.5% solution of the polymer in a mixture of phenol with tetrachloroethane (weight ratio 40:60) is 0.35 dl/g. The polymer yield is 85% as calculated for the mixture of the above-mentioned dichloroanhydrides.

EXAMPLE 10

In a manner similar to that described in the foregoing Example 4 there is obtained polypiperazine isophthalamide with the use, as the starting monomers, of piperazine and isophthalic acid dichloroanhydride. The reaction temperature is maintained at 70° C. The temperature of compressed air is 70°–85° C.

The logarithmic viscosity of a 0.5% solution of the polymer in sulphuric acid is 1.7 dl/g. The polymer yield is 88% as calculated for isophthalic acid dichloroanhydride.

EXAMPLE 11

An aqueous solution of hexamethylene diamine with the concentration of 0.1 mol/l heated to a temperature of from 90° to 95° C. at a rate of from 8 to 12 l/hr is continuously fed into a reactor. Isophthalic acid dichloroanhydride which is solid under normal conditions is dissolved in dichloromethane to the concentration of 16 mol/l of the solvent. After dissolution, isophthalic acid dichloroanhydride is continuously atomized through a nozzle by means of compressed air and added, in the form of an aerosol, into the aqueous solution of hexamethylene diamine. The size of aerosol particles of isophthalic acid dichloroanhydride is at most 70 mcm; concentration of said particles in the aerosol is $0.8\times10^{-4}$ mol/l of air. The supply rate of air into the nozzle is 2.5–3 $m^3$/hr; temperature of compressed air is 20°–25° C.

The resulting suspension of polyhexamethylene isophthalamide is continuously discharged from the reactor; the polymer is filtered-off, washed with water and dried.

The logarithmic viscosity of a 0.5% solution of the polymer in sulphuric acid is 1.28 dl/g. The polymer yield is 97% as calculated for isophthalic acid dichloroanhydride. The polymer softening temperature is 195° C.

EXAMPLE 12

Following the procedure described in the foregoing Example 11, a polymer is obtained on the basis of isophthalic acid dichloroanhydride and a mixture of 50% by weight of ethylene diamine and 50% of hexamethylene diamine.

The logarithmic viscosity of a 0.5% solution of the polymer in sulphuric acid is 1.02 dl.g. The polymer yield is 96% as calculated for isophthalic acid dichloroanhydride.

EXAMPLE 13

In a manner similar to that described in the foregoing Example 11, there is obtained polyhexamethylene terephthalamide with the use, as the starting monomers, of hexamethylene diamine and terephthalic acid dichloroanhydride. The process of interphase polycondensation is conducted under the pressure of 0.8 atm.g. and at a temperature within the range of from 110° to 115° C.

The logarithmic viscosity of a 0.5% solution of the polymer in sulphuric acid is 1.21 dl/g. The polymer yield is 93% as calculated for terephthalic acid dichloroanhydride. The softening point of the polymer is 250° C.

EXAMPLE 14

In a manner similar to that described in the foregoing Example 11 a polyamide is obtained on the basis of hexamethylene diamine and diphenyloxide-4,4′-dicarboxylic acid dichloroanhydride.

The logarithmic viscosity of a 0.5% solution of the polymer in sulphuric acid is 0.82 dl/g. The polymer yield is 92% as calculated for the starting dichloroanhydride. The softening temperature of the polymer is 310° C.

EXAMPLE 15

Following the procedure of Example 11 hereinbefore, there is obtained polypiperazine isophthalamide with the use, as the starting monomers, of piperazine and isophthalic acid dichloroanhydride.

The logarithmic viscosity of a 0.5% solution of the polymer in sulphuric acid is 1.4 dl/g. The polymer yield is 72% as calculated for isophthalic acid dichloroanhydride; the softening point of the polymer is 245° C.

EXAMPLE 16

In a manner similar to that described in Example 11 hereinbefore, there is obtained polypiperazinisophthalamide with the use, as the starting monomers, of piperazine and isophthalic acid dichloroanhydride. The reaction temperature is maintained at 40° C.

The logarithmic viscosity of a 0.5% solution of the polymer in sulphuric acid is 1.2 dl/g. The yield of the polymer is 68% as calculated for isophthalic acid dichloroanhydride. The softening temperature of the polymer is 245° C.

EXAMPLE 17

In a manner similar to that described in Example 11 hereinbefore, there is obtained polyhexamethylene isophthalamide with the use, as the starting monomers, of hexamethylene diamine and isophthalic acid dichloroanhydride. Prior to atomization, isophthalic acid dichloroanhydride is dissolved in tetrahydrofuran to the concentration of 20 mol/l of the solvent.

The logarithmic viscosity of a 0.5% solution of the polymer in sulphuric acid is 1.25 dl/g. The yield of the polymer is 96% as calculated for isophthalic acid dichloroanhydride. The softening temperature of the polymer is 198° C.

EXAMPLE 18

Following the procedure described in Example 11 hereinbefore, there is obtained polyhexamethylene terephthalamide with the use, as the starting monomers, of hexamethylene diamine and terephthalic acid dichloroanhydride. Prior to atomization, terephthalic acid dichloroanhydride is dissolved in benzene to the concentration of 5 mol/l of the solvent.

The logarithmic viscosity of a 0.5% solution of the polymer in sulphuric acid is 0.9 dl/g. The polymer yield is 94% as calculated for terephthalic acid dichloroanhydride. The softening point of the polymer is 250° C.

EXAMPLE 19

In a manner similar to that described in Example 11 hereinbefore, there is obtained polypiperazine isophthalamide with the use, as the starting monomers, of piperazine and isophthalic acid dichloroanhydride.

Prior to atomization, isophthalic acid dichloroanhydride is dissolved in methylethylketone to the concentration of 12 mol/l of the solvent.

The logarithmic viscosity of a 0.5% solution of the polymer in sulphuric acid is 1.8 dl/g. The polymer yield is 70% as calculated for isophthalic acid dichloroanhydride.

EXAMPLE 20

In a manner similar to that described in Example 11 hereinbefore there is obtained polyhexamethylene isophthalamide. Prior to atomization, isophthalic acid dichloroanhydride is dissolved in anhydrous acetic acid to the concentration of 10 mol/l of the solvent.

The logarithmic viscosity of a 0.5% solution of the polymer in sulphuric acid is 1.1 dl/g. The yield of the polymer is 92% as calculated for isophthalic acid dichloroanhydride.

EXAMPLE 21

Following the procedure described in the foregoing Example 11, there is obtained polyhexamethylene isophthalamide with the only exception that the concentration of particles of the atomized isophthalic acid dichloroanhydride in the aerosol is $0.4\times10^{-4}$ mol/l of air.

The logarithmic viscosity of a 0.5% solution of the polymer in sulphuric acid is 1.35 dl/g. The polymer yield is 96% as calculated for isophthalic acid dichloroanhydride. The softening temperature of the polymer is 195° C.

EXAMPLE 22

As in Example 11 hereinbefore, there is obtained polyethylene isophthalamide with the use, as the starting monomers, of ethylene diamine and isophthalic acid dichloroanhydride.

The logarithmic viscosity of a 0.5% solution of the polymer in sulphuric acid is 0.92 dl/g. The polymer yield is 82% as calculated for isophthalic acid dichloroanhydride. The softening point of the polymer is 220° C.

EXAMPLE 23

In a manner similar to that described in the foregoing Example 11, there is obtained polytetramethylene terephthalamide with the use, as the starting monomers, of tetramethylene diamine and terephthalic acid dichloroanhydride.

The logarithmic viscosity of a 0.5% solution of the polymer in sulphuric acid is 0.8 dl/g. The polymer yield is 80% as calculated for terephthalic acid dichloroanhydride. The polymer softening temperature is 415° C.

EXAMPLE 24

Following the procedure of Example 11 hereinbefore, there is obtained polydodecamethylene isophthalamide with the use, as the starting monomers, of dodecamethylene diamine and isophthalic acid dichloroanhydride.

The logarithmic viscosity of a 0.5% solution of the polymer in sulphuric acid is 0.4 dl/g. The yield of the polymer is 82% as calculated for isophthalic acid dichloroanhydride.

EXAMPLE 25

Following the procedure of the foregoing Example 11, a polyamide is obtained on the basis of terephthalic acid dichloroanhydride and N,β-aminoethylpiperazine.

The logarithmic viscosity of a 0.5% solution of the polymer in sulphuric acid is 0.72 dl/g. The polymer yield is 92% as calculated for terephthalic acid dichloroanhydride.

EXAMPLE 26

An aqueous solution of piperazine with the concentration of 0.2 mol/l heated to a temperature of 90°-95° C. is continuously fed into a reactor at the rate of 6 l/hr. Oxalic acid dichloroanhydride which is liquid under normal conditions, is continuously atomized in a nozzle by compressed air and in the form of an aerosol, is passed into the aqueous solution of piperazine. Concentration of particles of the atomized oxalic acid dichloroanhydride in the aerosol is $0.64\times10^{-4}$ mol/l of air. The supply rate of air into the nozzle is 2 $m^3$/hr; the temperature of compressed air is 20° to 25° C.

The resulting suspension of polypiperazinoxamide is continuously discharged from the reactor; the polymer is filtered off, washed with water and dried.

The logarithmic viscosity of a 0.5% solution of the polymer in sulphuric acid is 0.52 dl/g. The yield of the polymer is 27.4% as calculated for oxalic acid dichloroanhydride. The softening temperature of the polymer is 420° C. (with decomposition).

EXAMPLE 27

An aqueous solution of hexamethylene diamine with the concentration of 0.1 mol/l heated to a temperature of from 90° to 95° C. is continuously fed into a reactor at the rate of 30 l/hr. Adipic acid dichloroanhydride which is liquid under normal conditions, is continuously atomized through a nozzle by means of compressed air and passed, in the form of an aerosol, into the aqueous solution of hexamethylene diamine. The concentration of particles of atomized adipic acid dichloroanhydride in the aerosol is $0.5\times10^{-4}$ mol/l of air. The supply rate of air into the nozzle is 2.5-3 $m^3$/hr; the temperature of compressed air is 20°-25° C.

The resulting suspension of polyhexamethylene adipolyamide is continuously discharged from the reactor; the polymer is filtered-off, washed with water and dried.

The logarithmic viscosity of a 0.5% solution of the polymer in sulphuric acid is 0.81 dl/g. The yield of the polymer is 78% as calculated for adipic acid dichloroanhydride.

EXAMPLE 28

Following the procedure described in the foregoing Example 27, there is obtained polyhexamethylene azelainamide with the use, as the starting monomers, of hexamethylene diamine and azelaic acid dichloroanhydride.

The logarithmic viscosity of a 0.5% solution of the polymer in sulphuric acid is 0.73 dl/g. The polymer yield is 74% as calculated for azelaic acid dichloroanhydride.

EXAMPLE 29

In a manner similar to that described in Example 27 hereinbefore, there is obtained polyhexamethylene glutaramide with the use, as the starting monomers, of hexamethylene diamine and glutaric acid dichloroanhydride.

The logarithmic viscosity of a 0.5% solution of the polymer in sulphuric acid is 1.0 dl/g. Tje yield of the polymer is 80% as calculated for glutaric acid dichloroanhydride.

EXAMPLE 30

Following the procedure described in the foregoing Example 27, a polymer is obtained on the basis of hexamethylene diamine and a mixture of 30% by weight of terephthalic acid dichloroanhydride and 70% by weight of fumaric acid dichloroanhydride. The mixture of sid dichloroanhydrides comprises a liquid under normal conditions. This liquid is fed to atomization without any preliminary treatment.

The logarithmic viscosity of a 0.5% solution of the polymer in sulphuric acid is 0.9 dl/g. The yield of the polymer is 85% as calculated for the mixture of said dichloroanhydrides.

EXAMPLE 31

An aqueous solution of hexamethylene diamine with the concentration of 0.1 mol/l containing 0.02% by weight of a surfactant (a mixture of sodium alkylbenzene sulphonates, the alkyl radical containing 12 to 18 carbon atoms) heated to a temperature of from 90° to 95° C. is continuously fed into a reactor at the rate of 20–25 l/hr. Terephthalic acid dichloroanhydride which is solid under normal conditions is melted and continuously atomized, still in the molten state, through a nozzle by means of compressed air thus producing an aerosol of terephthalic acid dichloroanhydride. The latter, in the form of an aerosol is passed into the aqueous solution of hexamethylene diamine containing the above-mentioned surfactant. The concentration of particles of atomized terephthalic acid dichloroanhydride in the aerosol is $0.5\times10^{-4}$ mol/l of air. The rate of air supply into the nozzle is 2.5 $m^3$/hr; temperature of compressed air is 120°–140° C.

The resulting polymer suspension is continuously discharged from the reactor; the polymer is filtered-off and washed with water.

The polymer is obtained in the form of fibrides. The yield of the polymer is 95% as calculated for terephthalic acid dichloroanhydride.

The thus-produced fibrides have the following properties logarithmic viscosity of a 0.5% solution

| | |
|---|---|
| of the polymer in sulphuric acid, dl/g | 0.8 |
| fineness, Schopper-Rigler degrees | 42 |
| water uptake, wt.% | 2,900 |
| tensile strength of a sample of the synthetic paper produced from the fibrides, kgf/$cm^2$ | 380. |

EXAMPLE 32

In a manner similar to that described in the foregoing Example 31, a polymer is obtained in the form of fibrides on the basis of hexamethylene diamine and a mixture of 90% by weight of terephthalic acid dichloroanhydride and 10% by weight of isophthalic acid dichloroanhydride. As the surfactant, use is made of polyoxyethylene ether of isooctylphenol of the formula:

$$C_8H_{17}C_6H_4—O(CH_2CH_2O)_{n-1}—CH_2CH_2OH$$

wherein n=7. The content of said surfactant in the aqueous solution of hexamethylene diamine is 10% by weight.

The polymer is obtained in the form of fibrides. The polymer yield is 96% as calculated for the mixture of the above-mentioned dichloroanhydrides.

The resulting fibrides have the following properties; logarithmic viscosity of a 0.5% solution

| | |
|---|---|
| of the polymer in sulphuric acid, dl/g | 0.8 |
| fineness, Schopper-Rigler degrees | 58 |
| water uptake, wt.% | 2,300 |
| tensile strength of a sample of the synthetic paper produced from the fibrides, kgf/$cm^2$ | 420. |

EXAMPLE 33

In a manner similar to that described in the foregoing Example 31, a polymer is obtained in the form of fibrides on the basis of piperazine and terephthalic acid dichloroanhydride. As the surfactant, use is made of sodium diisopropylnaphthalene sulphonate. The surfactant content in the aqueous solution of piperazine is 5% by weight.

The resulting fibrides have the following properties: logarithmic viscosity of a 0.5% solution of the

| | |
|---|---|
| polymer in sulphuric acid, dl/g | 1.32 |
| fineness, Schopper-Rigler degrees | 62 |
| water uptake, wt.% | 3,800 |
| tensile strength of a sample of the synthetic paper produced from the fibrides, kgf/$cm^2$ | 280. |

EXAMPLE 34

In a manner similar to that described in the foregoing Example 31, a polymer is obtained in the form of fibrides on the basis of diphenylolpropane and a mixture of 80% by weight of terephthalic acid dichloroanhydride and 20% by weight of isophthalic acid dichloroanhydride. To combine the evolved hydrogen chloride, into the aqueous solution of diphenylolpropane, there is added caustic soda in the amount of 2 moles per 1 mole of diphenylolpropane. As the surfactant, use is made of polyoxyethylene ether of isooctylphenol of the formula:

$$C_8H_{17}C_6H_4—O(CH_2CH_2O)_{n-1}—CH_2CH_2OH,$$

wherein n=7.

The content of said surfactant in the aqueous solution of diphenylolpropane is 0.5% by weight. Prior to atomization, the mixture of said dichloroanhydrides which is solid under normal conditions is melted. The atomization is effected by means of compressed argon or nitrogen.

The resulting fibrides have the following properties: logarithmic viscosity of a 0.5% solution of the polymer in a mixture of phenol with tetrachloroethane (weight ratio of 40:60 respectively),

| | |
|---|---|
| dl/g | 0.4 |
| fineness, Schopper-Rigler degrees | 70 |
| water uptake, wt.% | 1,800 |
| tensile strength of a sample of the synthetic paper produced from the fibrides, kgf/$cm^2$ | 290. |

EXAMPLE 35

An aqueous solution of hexamethylene diamine with the concentration of 0.1 mol/l heated to the temperature of 90°-95° C. is continuously fed, at the rate of 40 l/hr, over the top surface of a horizontally mounted grate of a vertical reactor. The grate has a free section of 55% and holes with the diameter of 1.5 mm. In the bottom section of the reactor, a gas nozzle is mounted under the grate. Terephthalic acid dichloroanhydride is continuously atomized in the form of an aerosol through said nozzle and passed, from under said grate, into the aqueous solution of hexamethylene diamine.

Prior to atomization, terephthalic acid dichloroanhydride which is solid under normal conditions is dissolved in dichloromethane to the concentration of 5 mol/l of the solvent.

Concentration of particles of the atomized terephthalic acid dichloroanhydride in the aerosol is $1.5\times10^{-4}$ mol/l of air. The supply rate of air into the nozzle is 2.5-3 $m^3$/hr; the temperature of compressed air is 20°-25° C.

The resulting suspension of the polymer is continuously discharged from the reactor; the polymer is filtered-off and washed with water.

The polymer is obtained in the form of fibrides. The yield of the polymer is 94-96% as calculated for terephthalic acid dichloroanhydride.

The resulting fibrides have the following properties: logarithmic viscosity of a 0.5% solution of the

| | |
|---|---|
| polymer in sulphuric acid, dl/g | 0.9 |
| fineness, Schopper-Rigler degrees | 42 |
| water uptake, wt.% | 2,800 |
| tensile strength of a sample of the synthetic paper produced from the fibrides, kgf/cm$^2$ | 380. |

EXAMPLE 36

In a manner similar to that described in the foregoing Example 35, a polymer is obtained in the form of fibrides on the basis of piperazine and a mixture of 20% by weight of isophthalic acid dichloroanhydride and 80% by weight of terephthalic acid dichloroanhydride.

The resulting fibrides have the following properties: logarithmic viscosity of a 0.5% solution of the

| | |
|---|---|
| polymer in sulphuric acid, dl/g | 0.95 |
| fineness, Schopper-Rigler degrees | 43 |
| water uptake, wt.% | 2,110 |
| tensile strength of a sample of the synthetic paper produced from the fibrides, kgf/cm$^2$ | 240. |

EXAMPLE 37

An aqueous solution of hexamethylene diamine heated to a temperature of from 90° to 95° C. with the concentration of 0.1 mol/l, is continuously atomized at the rate of 600 l/hr by means of a mechanical nozzle (without any use of a compressed gas) over a horizontally mounted grate of a vertical reactor so that the stream of the atomized (sprayed) aqueous solution would totally cover the grate section (the grate has the free section of 36%, and holes with the diameter of 5 mm).

In the bottom section of the reactor, a gas nozzle is placed under the grate. By means of this latter nozzle, terephthalic acid dichloroanhydride is continuously atomized in the form of an aerosol by means of compressed air; this aerosol, having passed through the grate, is further moved counter-currently to the atomized aqueous solution of hexamethylene diamine.

Prior to atomization, terephthalic acid dichloroanhydride which is solid under normal conditions, is dissolved in dichloromethane to the concentration of 5 mol/l of the solvent.

Concentration of particles of the atomized terephthalic acid dichloroanhydride in the aerosol is $2\times10^{-4}$ mol/l of air. The rate of air supply into the nozzle is 150 $m^3$/hr; temperature of compressed air is 20°-25° C.

The resulting suspension of the polymer is continuously discharged from the reactor; the polymer is filtered-off and washed with water.

The polymer is obtained in the form of fibrides. The yield of the polymer is 80% by weight as calculated for terephthalic acid dichloroanhydride.

The resulting fibrides have the following properties: logarithmic viscosity of a 0.5% solution of

| | |
|---|---|
| the polymer in sulphuric acid, dl/g | 0.7 |
| fineness, Schopper-Rigler degrees | 52 |
| water uptake, wt.% | 2,700 |
| tensile strength of a sample of the synthetic paper produced from the fibrides, kgf/cm$^2$ | 460. |

EXAMPLE 38

An aqueous solution of piperazine with the concentration of 0.05 mol/l heated to the temperature of 85° C., is continuously fed at the rate of 17 l/hr onto the top surface of a horizontally mounted grate of a vertical reactor. The grate has the free section of 65% and holes with the diameter of 2 mm. In the lower section of the reactor, a gas nozzle is mounted under the grate. Terephthalic acid dichloroanhydride is atomized through said gas nozzle by means of compressed air in the form of an aerosol which is passed, through said grate, into the aqueous solution of piperazine.

Prior to atomization, terephthalic acid dichloroanhydride which is solid under normal conditions is melted.

Concentration of particles of atomized terephthalic acid dichloroanhydride in the aerosol is $0.7\times10^{-4}$ mol/l of air. The rate of air supply into the nozzle is 5 $m^3$/hr; temperature of compressed air is 120°-140° C.

The resulting polymer suspension is continuously discharged from the reactor; polymer is filtered-off and washed with water.

The polymer is obtained in the form of fibrides. The yield of the polymer is 60% as calculated for terephthalic acid dichloroanhydride.

The resulting fibrides have the following properties: logarithmic viscosity of a 0.5% solution of

| | |
|---|---|
| the polymer in sulphuric acid, dl/g | 1.12 |
| fineness, Schopper-Rigler degrees | 85 |
| water uptake, wt.% | 4,000 |
| tensile strength of a sample of the synthetic paper produced from the fibrides, kgf/cm$^2$ | 310. |

EXAMPLE 39

In a manner similar to that described in the foregoing Example 38, a polymer is obtained in the form of fibrides on the basis of hexamethylene diamine and fumaric acid dichloroanhydride.

Fumaric acid dichloroanhydride which is liquid under normal conditions, is directly fed to atomization without any preliminary treatment. Temperature of compressed air is 20°-25° C.

The resulting insoluble polymer is obtained in the form of fibrides. The polymer yield is 85% as calculated for fumaric acid dichloroanhydride.

The resulting fibrides have the following properties:

| | |
|---|---|
| fineness, Schopper-Rigler degrees | 42 |
| water uptake, wt.% | 2,300 |
| tensile strength of a sample of the synthetic paper produced from the fibrides, kgf/cm$^2$ | 255. |

EXAMPLE 40

An aqueous solution of diphenylolpropane with the concentration of 0.05 mol/l containing 0.1 mol/l of caustic soda and heated to a temperature of 90°-95° C., is continuously fed at the rate of 30 l/hr onto the top surface of a horizontally mounted grate of a vertical reactor. The grate has the free section of 25% and holes with the diameter of 2.5 mm. In the lower section of the reactor, a gas nozzle is mounted under the grate. A mixture of 60% by weight of isophthalic acid dichloroanhydride and 40% by weight of terephthalic acid dichloroanhydride is atomized through said nozzle by means of compressed nitrogen and passed in the form of an aerosol into the aqueous solution of diphenylolpropane through said grate.

Prior to atomization, the mixture of said dichloroanhydrides which is solid under normal conditions is melted.

Concentration of particles of the atomized mixture of dichloroanhydrides in the aerosol is $1\times10^{-4}$ mol/l of nitrogen. The rate of nitrogen supply into the nozzle is 3 m$^3$/hr; temperature of compressed nitrogen is 80° C.

The resulting suspension of the polymer is continuously discharged from the reactor; the polymer is filtered off and washed with water.

The polymer is obtained in the form of fibrides. The yield of the polymer is 82% as calculated for the mixture of said dichloroanhydrides.

The resulting fibrides have the following properties: logarithmic viscosity of a 0.5% solution of

| | |
|---|---|
| the polymer in a mixture of phenol with tetrachloroethane (weight ratio of 40:60), dl/g | 0.42 |
| fineness, Schopper-Rigler degrees | 72 |
| water uptake, wt.% | 1,800 |
| tensile strength of a sample of the synthetic paper produced from the fibrides, kgf/cm$^2$ | 280. |

EXAMPLE 41

In a manner similar to that of Example 31, a polymer is obtained in the form of fibrides, with the only exception that the process of interphase polycondensation is conducted under the pressure of 0.8 atm. g and at a temperature of 110°-115° C.

The logarithmic viscosity of a 0.5% solution of the polymer in sulphuric acid is 0.95 dl/g; other properties of the fibrides are the same as in Example 31 hereinbefore.

EXAMPLE 42

Following the procedure described in Example 38 hereinbefore, a polymer is obtained in the form of fibrides, with the only exception that the process of interphase polycondensation is conducted under the pressure of 0.8 atm.g. at a temperature of 110°-115° C.

The logarithmic viscosity of a 0.5% solution of the polymer in sulphuric acid is 1.25 dl/g; other properties of the fibrides are the same as in Example 38 hereinbefore.

EXAMPLE 43

Hexamethylenediamine in the amount of 11.621 g is dissolved in 1 liter of distilled water. The solution is heated to 98° C. and poured into a heated reactor, wherein temperature is maintained within 95°-98° C. A melt consisting of 4.06 g of isophthalic acid dichloroanhydride and 1.01 g of terephthalic acid dichloroanhydride is atomized through a nozzle by means of compressed air at the temperature of 50° C. in the form of an aerosol which is passed into the aqueous solution of hexamethylene diamine. Concentration of particles of the atomized mixture of dichloroanhydrides in the aerosol is $0.4\times10^{-4}$ mol/l of air. Duration of the interphase polycondensation is 2 min.

The resulting polymer is filtered-off, washed with water and dried. The yield of the polymer is 95% as calculated for the mixture of said dichloroanhydrides. The logarithmic viscosity of a 0.5% solution of the polymer in sulphuric acid is 1.05 dl/g.

What is claimed is:

1. A method for preparing heterochain polymers selected from the group consisting of polyamides and polyarylates, comprising interphase polycondensation of dihaloanhydrides of dicarboxylic acids with aqueous solutions of bisfunctional compounds selected from the group consisting of diamines and bisphenols, in the presence of an acid acceptor, said interphase polycondensation being carried out at a temperature of 20°-115° C. and pressure of 0 to 0.8 atm. gauge by atomizing said dihaloanhydrides of dicarboxylic acids in the form of an aerosol by a compressed gas, into an aqueous solution of said bisfunctional compounds; the concentration of dihaloanhydrides of dicarboxylic acids in the aerosol being maintained within the range of $0.4\times10^{-4}$ to $2\times10^{-4}$ mol/liter of the gas; the dihaloanhydrides of dicarboxylic acids, which are solid under normal conditions, are liquefied prior to atomization by melting or by solution in a solvent inert, to the dihaloanhydrides at a concentration of from 5 to 20 moles of dihaloanhydride per liter of solvent; the dihaloanhydrides of dicarboxylic acids, which are liquid under normal conditions, are atomized directly and the product is recovered from the interphase polycondensation suspension.

2. A method as claimed in claim 1, wherein the dihaloanhydrides of dicarboxlic acids, which are solid under normal conditions, are liquefied by melting.

3. A method as claimed in claim 1, wherein the dihaloanhydrides of dicarboxylic acids, which are solid under normal conditions, are liquefied by being dissolved in organic solvents which are inert in respect of dihaloanhydrides of dicarboxylic acids, to a concentration of 5 to 20 mol/liter of the solvent.

4. A method as claimed in claim 1, wherein use is made of diamines selected from the group consisting of ethylene diamine, tetramethylene diamine, hexamethylene diamine, dodecamethylene diamine, piperazine, N, β-aminoethylpiperazine, meta-xylylene diamine, para-xylylene diamine, meta-phenylene diamine and a mixture of ethylene diamine with hexamethylene diamine.

5. A method as claimed in claim 1, wherein use is made of bisphenols selected from the group consisting of resorcinol and dipehnylolpropane.

6. A method as claimed in claim 1, wherein use is made of dihaloanhydrides of dicarboxylic acids selected from the group consisting of oxalic acid dichloroanhydride, glutaric acid dichloroanhydride, azelaic acid dichloroanhydride, adipic acid dichloroanhydride, fumaric acid dichloroanhydride, isophthalic acid dichloroanhydride, terephthalic acid dichloroanhydride, diphenyloxide-4,4'-dicarboxylic acid dichloroanhydride; isophthalic acid difluoroanhydride; a mixture of dichloroanhydrides of isophthalic and terephthalic acids; a mixture of dichloroanhydrides of fumaric and terephthalic acids.

7. A method as claimed in claim 1, wherein use is made of organic solvents inert in respect of dicarboxylic acid dihaloanhydrides selected from the group consisting of dichloromethane, tetrahydrofuran, benzene, methylethylketone and anhydrous acetic acid.

8. A method as claimed in claim 1, wherein the interphase polycondensation is conducted at a temperature of from 90° to 95° C.

9. A method as claimed in claim 1, wherein the interphase polycondensation is conducted under the pressure of 0.8 atm.g. at a temperature of from 110° to 115° C.

10. A method as claimed in claim 1, wherein use is made of an aqueous solution of bisfunctional compounds containing 0.02 to 10% by weight of a surfactant.

11. A method as claimed in claim 10, wherein use is made of a surfactant selected from the group consisting of a mixture of sodium alkylbenzene sulphonates with the alkyl radical containing 12 to 18 carbon atoms, sodium diisopropylnaphthalene sulphonate, and polyoxyethylene ether of isooctylphenol.

12. A method as claimed in claim 1, wherein dihaloanhydrides of dicarboxylic acids are atomized in the form of an aerosol by compressed gas into an aqueous solution of bisfunctional compounds through a grate with a free section of from 25 to 65% and with holes having a diameter of from 1.5 to 5 mm.

13. A method as claimed in claim 12, wherein simultaneously with atomization of dihaloanhydrides of dicarboxylic acids an aqueous solution of bisfunctional compounds is also atomized counter-currently to the aerosol so that the stream of the atomized aqueous solution covers the entire cross-section of the grate.

* * * * *

UNITED STATES PATENT AND TRADEMARK OFFICE
CERTIFICATE OF CORRECTION

PATENT NO. : 4,223,105 Page 1 of 3

DATED : September 16, 1980

INVENTOR(S) : Vadim B. Igonin, et al

It is certified that error appears in the above—identified patent and that said Letters Patent is hereby corrected as shown below:

In the Abstract, line 5 from bottom: Delete "pg,2".

Column 1, line 19: "a aerosol" should be --an aerosol--.

line 58: "of" (last occurrence) should be --or--.

Column 2, line 22: "filler" should be --filter--.

line 26: "sufactant" should be --surfactant--.

line 35: "of" (last occurrence) should be --or--.

line 62 & 68, "regneration" should be --regeneration--.

Column 4, line 46: "where, monomers, as the starting use" should be --where, as the starting monomers, use--.

Column 6, line 36: "iosphthalic" should be --isophthalic--.

Column 11, line 4: "Tje" should be --The--.

line 14: "sid" should be --said--.

line 34: After "aerosol" insert a comma.

lines 47-48: After "properties" insert a colon.

Column 11, line 48 and Column 12, line 8: Cancel "logarithmic viscosity of a 0.5% solution".

UNITED STATES PATENT AND TRADEMARK OFFICE

CERTIFICATE OF CORRECTION

PATENT NO. : 4,223,105 
DATED : September 16, 1980 
INVENTOR(S) : Vadim B. Igonin, et al It is certified that error appears in the above—identified patent and that said Letters Patent is hereby corrected as shown below:

Column 11, line 51 and Column 12, line 11: "of the polymer in sulphuric acid, dl/g" should be --logarithmic viscosity of a 0.5% solution of the polymer in sulphuric acid, dl/g--.

Column 12, line 7: "properties;" should be --properties:--.

Column 12, line 27 & Column 13, lines 31 and 48: Cancel each of these lines in its entirety.

Column 12, line 30 & Column 13, lines 33 and 50: "polymer in sulphuric acid, dl/g" should be --logarithmic viscosity of a 0.5% solution of the polymer in sulphuric acid, dl/g--.

Column 12, lines 59-61, beginning with "logarithmic" and ending with "respectively)," should be cancelled in their entirety.

line 63: "dl/g" should be --logarithmic viscosity of a 0.5% solution of the polymer in a mixture of phenol with tetrachloroethane (weight ratio of 40:60 respectively), dl/g--.

Column 14, lines 24 & 60: Cancel these lines in their entirety.

lines 27 & 62: "the polymer in sulphuric acid, dl/g" should be --logarithmic viscosity of a 0.5% solution of the polymer in sulphuric acid, dl/g--.

Column 15, line 52: Cancel in its entirety.

UNITED STATES PATENT AND TRADEMARK OFFICE

CERTIFICATE OF CORRECTION

PATENT NO. : 4,223,105

DATED : September 16, 1980

INVENTOR(S) : Vadim B. Igonin, et al

It is certified that error appears in the above—identified patent and that said Letters Patent is hereby corrected as shown below:

Column 15, lines 55-56: "the polymer in a mixture of phenol with tetrachloroethane (weight ratio of 40:60), dl/g" should be --logarithmic viscosity of a 0.5% solution of the polymer in a mixture of phenol with tetrachloroethane (weight ratio of (40:60), dl/g--.

Column 17, line 11: "dipehnylolpropane" should be --diphenylolpropane--.

Column 18, line 5: "the" should be --a--.

Signed and Sealed this

*Nineteenth* Day of *May 1981*

[SEAL]

*Attest:*

RENE D. TEGTMEYER

*Attesting Officer* *Acting Commissioner of Patents and Trademarks*